United States Patent Office 3,702,835
Patented Nov. 14, 1972

3,702,835
ROOM TEMPERATURE VULCANIZABLE SILICONE ELASTOMER CONTAINING MOLYBDENUM BLUE
Thomas W. Greenlee, Midland, Mich., assignor to Dow Corning Corporation, Midland, Mich.
No Drawing. Filed June 18, 1971, Ser. No. 154,649
Int. Cl. C08h 9/00
U.S. Cl. 260—18 S
5 Claims

ABSTRACT OF THE DISCLOSURE

Room temperature vulcanizable silicone elastomer composition prepared by mixing a hydroxyl endblocked polydiorganosiloxane, an alkoxy silicon compound, a metal salt of a carboxylic acid and molybdenum blue has increased tear strength and modulus.

This invention relates to room temperature vulcanizable silicone elastomers which have increased tear strength and modulus.

This invention relates to a room temperature vulcanizable silicone elastomer composition consisting essentially of a composition prepared by mixing (A) 100 parts by weight of a hydroxyl endblocked polydiorganosiloxane having a viscosity of from 1000 to 100,000 cs. at 25° C. and having organic radicals selected from the group consisting of methyl, ethyl, phenyl and 3,3,3-trifluoropropyl wherein at least 50 percent of the organic radicals are methyl radicals, (B) from 1 to 15 parts by weight of an alkoxy silicon compound selected from the group consisting of tetraalkoxysilane, alkylpolysilicate, monoorganotrialkoxysilane and partial hydrolyzates of the monoorganotrialkoxysilane and mixtures thereof wherein the organic group is selected from the group consisting of alkyl radicals having from 1 to 6 carbon atoms inclusive, vinyl radicals, phenyl radicals and 3,3,3-trifluoropropyl radicals and the alkoxy radicals and the alkyl radicals have from 1 to 6 carbon atoms inclusive, (c) from 0.1 to 10 parts by weight of a metal salt of a carboxylic acid catalyst, and (D) from 0.01 to 1.0 part by weight molybdenum in the form of molybdenum blue.

The room temperature vulcanizable silicone elastomer compositions of the present invention are known as two package or two component compositions. Two or more packages are needed because the composition begins curing when the hydroxyl endblocked polydiorganosiloxane, the alkoxy silicon compound and the catalyst, the metal salt of a carboxylic acid, are mixed. For this reason, the ingredients are separated into separate packages until the user wishes curing to begin. Usually, the hydroxyl endblocked polydiorganosiloxane and the filler, when present, are stored in one package and the alkoxy silicon compound and catalyst are stored in another package. The molybdenum blue can be added to either package, preferably it is mixed and stored with the polydiorganosiloxane.

The room temperature vulcanizable silicone elastomer compositions of the present invention are well known in the art if the presence of the molybdenum blue is excluded and are available commercially.

The hydroxyl endblocked polydiorganosiloxane can have a viscosity of from 1000 to 100,000 cs. at 25° C., preferably from 1000 to 50,000 cs. at 25° C. The organic radicals of the polydiorganosiloxane can be methyl, ethyl, phenyl and 3,3,3-trifluoropropyl where at least 50 percent of the organic radicals are methyl. The hydroxyl endblocked polydiorganosiloxanes can be illustrated by polydimethylsiloxane, polymethyl - 3,3,3 - trifluoropropylsiloxane, polyethylmethylsiloxane, polydiethylsiloxane and polydiorganosiloxanes which are copolymers of two or more units of dimethylsiloxane units, diphenylsiloxane units, methylphenylsiloxane units, diethylsiloxane units and 3,3,3-trifluoropropylmethylsiloxane units. Mixtures and blends of polydiorganosiloxanes can also be used.

The crosslinking agent can be an alkoxy silicon compound which can be illustrated by orthosilicates such as ethylorthosilicate, n - propylorthosilicate, amylorthosilicate, pentenylorthosilicate, diethyldipropylorthosilicate and hexylorthosilicate, alkylpolysilicates such as methylpolysilicate, ethylpolysilicate, isopropylpolysilicate, n-propylpolysilicate, secondary amylpolysilicate and n-butylpolysilicate; monoorganotrialkoxysilanes such as methyltrimethoxysilane, ethyltriethoxysilane, propyltrimethoxysilane, methyltriisopropoxysilane, phenyltrimethoxysilane, vinyltrimethoxysilane; and other alkoxy silicon compounds such as

$$Si(OCH_2CH_2OCH_3)_4$$

$$Si(OCH_2CH_2OCH_2CH_3)_4$$

$$C_6H_5Si(OCH_2CH_2OCH_3)_3$$

$$CF_3CH_2CH_2Si(OCH_2CH_2OCH_3)_3$$

and the like. The alkoxy silicon compound is present in an amount of from 1 to 15 parts by weight per 100 parts by weight of the hydroxyl endblocked polydiorganosiloxane, preferably from 2 to 10 parts by weight.

The curing catalyst can be illustrated by metal salts of carboxylic acids such as lead naphthenate, cobalt naphthenate, zinc naphthenate, sodium naphthenate, iron 2-ethylhexoate, lead 2-ethylhexoate, chromium octoate, dibutyltin dibenzoate, dibutyltin adipate, lead sebacate, dibutyltin dilactate, dibutyltin diacetate, dibutyltin dilaurate, lead octoate, tin ricinoleate, cobalt hexoate, aluminum acetylacetonate, zirconium acetoacetate, dioctyltindimaleinate, stannous octoate and the like. The metal salt of a carboxylic acid is present in an amount of from 0.1 to 10 parts by weight per 100 parts by weight of the hydroxyl endblocked polydiorganosiloxane, preferably from 0.5 to 5 parts by weight.

The hydroxyl endblocked polydiorganosiloxanes, the alkoxy silicon compound and the metal salt of a carboxylic acid are further defined in the following patents with respect to ingredients and methods of combining the ingredients. The following patents are hereby incorporated by reference and include U.S. Pat. No. 2,843,555 by Berridge, U.S. Pat. No. 2,902,467 by Chipman, U.S. Pat. No. 2,927,907 by Polmanteer, U.S. Pat. No. 3,065,194 by Nitzsche et al., U.S. Pat. No. 3,070,559 by Nitzsche et al., U.S. Pat. No. 3,070,566 by Nitzsche et al., U.S. Pat. No. 3,127,363 by Nitzsche et al. and U.S. Pat. No. 3,305,502 by Lampe.

The molybdenum blue is the ingredient which enhances the tear strength and increases the modulus of the cured elastomer. Molybdenum blue is a well known substance and is an oxide of molybdenum where the molybdenum has two valence states, +5 and +6. One formula given in the prior art is $Mo_8O_{23} \cdot xH_2O$, while a more recent formula is $MoO_2 \cdot 4MoO_3 \cdot H_2O$. The molybdenum blue is present in an amount to provide from 0.01 to 1.0 part by weight of molybdenum per 100 parts by weight of polydiorganosiloxane, preferably from 0.05 to 0.5 part by weight molybdenum. The molybdenum blue can be added as a solid or in solution such as an alcohol solution particularly those alcohols having from 2 to 4 carbon atoms.

The room temperature vulcanizable silicone elastomers of this invention can also contain fillers and additives which are well known in the art as described in the patents incorporated herein by reference.

The room temperature vulcanizable silicone elastomer is prepared by mixing all the ingredients. The method of mixing can be any of those known in the art. The room temperature vulcanizable silicone elastomer can be packaged and stored as described above and mixed when cure is desired.

The room temperature vulcanizable silicone elastomers exhibit increased tear strength and increased modulus compared to the same compositions without the molybdenum blue.

The following examples are illustrative only and should not be construed as limiting the present invention which is properly delineated in the claims.

EXAMPLE 1

(A) A room temperature vulcanizable silicone elastomer was prepared by mixing 100 parts by weight of a hydroxyl endblocked polydimethylsiloxane having a viscosity of 12,500 cs. at 25° C., 30 parts by weight of a fume silica filler having the surface treated with trimethylsiloxy groups, 4 parts by weight of n-propylorthosilicate and 0.3 part by weight dibutyltindiacetate.

(B) A room temperature vulcanizable silicone elastomer was prepared as described above in (A) except 0.087 part by weight molybdenum was added in the form of molybdenum blue in butyl alcohol.

(C) A room temperature vulcanizable silicone elastomer was prepared as described above in (A) except 0.24 part by weight molybdenum was added in the form of molybdenum blue in butyl alcohol.

(D) A room temperature vulcanizable silicone elastomer prepared as described above in (A) except 0.087 part by weight molybdenum was added in the form of $MoO_2(OCH_2CH_2CH_2CH_3)_2$ butanol solution (yellow).

(E) A room temperature vulcanizable silicone elastomer prepared as described above in (A) except 0.24 part by weight molybdenum was added in the form of $MoO_2(OCH_2CH_2CH_2CH_3)_2$ butanol solution (yellow).

(F) The molybdenum blue was prepared by making $MoO_2(OCH_2CH_2CH_2CH_3)_2$ and exposing this to the atmosphere whereby it turns dark blue upon the formation of molybdenum blue. The $MoO_2(OCH_2CH_2CH_2CH_3)_2$ was prepared by reacting $MoO_2Cl_2$ with sodium and n-butanol.

The properties were measured at ambient conditions on samples pressed from 1/16 inch thick sheets of the cured room temperature vulcanizable silicone elastomer. The results were as shown in Table I.

TABLE I

| Elastomer | Test conditions | Tear strength, p.l.i. | Tensile strength at break, p.s.i. | Elongation at break, percent | 100% modulus, p.s.i. |
|---|---|---|---|---|---|
| A | Cured 7 days | 100 | 946 | 714 | 83 |
| B | do | 126 | 970 | 430 | 230 |
| B | Cured 7 days, boiled in water 3 hours, tested at once | | 680 | 335 | 200 |
| B | Cured 7 days, boiled in water 3 hours, tested after 16 hours | | 683 | 310 | 200 |
| B | Cured 7 days, heated 3 hours at 90° C | | 830 | 375 | 220 |
| C | Cured 7 days | 168 | 935 | 420 | 200 |
| C | Cured 7 days, boiled in water 3 hours, tested at once | | 695 | 360 | 175 |
| C | Cured 7 days, boiled in water 3 hours, tested after 16 hours | | 820 | 410 | 190 |
| C | Cured 7 days, heated 3 hours at 90° C | | 840 | 400 | 210 |
| D | Cured 7 days | 148 | 863 | 763 | 87 |
| E | do | 111 | 760 | 640 | 74 |

That which is claimed is:

1. A room temperature vulcanizable silicone elastomer composition consisting essentially of a composition prepared by mixing
    (A) 100 parts by weight of a hydroxyl endblocked polydiorganosiloxane having a viscosity of from 1000 to 100,000 cs. at 25° C. and having organic radicals selected from the group consisting of methyl, ethyl, phenyl and 3,3,3-trifluoropropyl wherein at least 50 percent of the organic radicals are methyl radicals,
    (B) from 1 to 15 parts by weight of an alkoxy silicon compound selected from the group consisting of tetraalkoxysilane, alkylpolysilicate, monoorganotrialkoxysilane and partial hydrolyzates of the monoorganotrialkoxysilane and mixtures thereof wherein the organic group is selected from the group consisting of alkyl radicals having from 1 to 6 carbon atoms inclusive, vinyl radicals, phenyl radicals and 3,3,3-trifluoropropyl radicals and the alkoxy radicals and the alkyl radicals having from 1 to 6 carbon atoms inclusive,
    (C) from 0.1 to 10 parts by weight of a metal salt of a carboxylic acid catalyst, and
    (D) from 0.01 to 1.0 part by weight molybdenum in the form of molybdenum blue.

2. The room temperature vulcanizable silicone elastomer composition according to claim 1 wherein a filler is also present.

3. The room temperature vulcanizable silicone elastomer composition according to claim 1 wherein the molybdenum is present in an amount of from 0.05 to 0.5 part by weight.

4. The room temperature vulcanizable silicone elastomer composition according to claim 3 wherein the alkoxy silicon compound is tetraalkoxysilane.

5. The room temperature vulcanizable silicone elastomer composition according to claim 1 wherein the molybdenum blue is added in an alcohol solution where the alcohol has from 2 to 4 inclusive carbon atoms.

References Cited

UNITED STATES PATENTS

| 3,065,194 | 11/1962 | Nitzsche et al. | 260—37 |
| 3,509,081 | 4/1970 | Gignac, Jr. | 260—18 |
| 3,518,222 | 6/1970 | Ostrowski | 260—37 |

OTHER REFERENCES

Killeffer et al., Molybdenum Compounds, pp. 42–45, Interscience Publ., New York, 1952.

DONALD E. CZAJA, Primary Examiner

M. I. MARQUIS, Assistant Examiner

U.S. Cl. X.R.

260—37 SB, 46.5 G, 825